United States Patent [19]

Motooka et al.

[11] Patent Number: 5,668,936
[45] Date of Patent: Sep. 16, 1997

[54] PRINTER FOR EXCLUSIVELY SELECTING A HOST APPARATUS AND A COMMAND SYSTEM FOR USE WITH THE SELECTED HOST APPARATUS

[75] Inventors: Shigenori Motooka, Nishinomiya; Kouichi Shibata, Sakai, both of Japan

[73] Assignee: Mita Industrial Co., Ltd., Osaka, Japan

[21] Appl. No.: 944,330

[22] Filed: Sep. 14, 1992

[30] Foreign Application Priority Data

Sep. 25, 1991 [JP] Japan ................................ 3-274665
Sep. 25, 1991 [JP] Japan ................................ 3-274666

[51] Int. Cl.⁶ ........................................... G06K 15/00
[52] U.S. Cl. ................................... 395/114; 395/112
[58] Field of Search ............................ 395/112, 113, 395/114, 115, 101, 275, 500; 358/402, 445, 467, 470; 364/512, 519

[56] References Cited

U.S. PATENT DOCUMENTS 4,968,159  11/1990  Sasaui et al. ........................... 400/76
4,992,957  2/1991   Aoyama et al. ........................ 364/519
5,018,079  5/1991   Shukunami et al. .................... 364/512
5,075,874  12/1991  Steeves et al. ........................ 395/112
5,165,014  11/1992  Vassar .................................... 395/112
5,268,993  12/1993  Ikenoue et al. ....................... 395/114
5,274,810  12/1993  Meldrum ............................... 395/700

*Primary Examiner*—Edward L. Coles, Sr.
*Assistant Examiner*—Gabriel I. Garcia
*Attorney, Agent, or Firm*—Beveridge, DeGrandi, Weilacher & Young, LLP

[57] ABSTRACT

When data is sent from an arbitrary host interface out of a plurality of host interfaces for connecting a plurality of host apparatuses, the acceptance of the data is started, and the acceptance of data from the other host interfaces are inhibited. When it is judged that the acceptance of data corresponding to all pages sent has been terminated, a state where the acceptance of the data from the other host interfaces (from which data are inhibited from being accepted) is being inhibited is released. Consequently, even when data are simultaneously sent from two or more host apparatuses to a printer, it is possible to normally print out the data.

10 Claims, 7 Drawing Sheets

PRINTER FOR EXCLUSIVELY SELECTING A HOST APPARATUS AND A COMMAND SYSTEM FOR USE WITH THE SELECTED HOST APPARATUS

BACKGROUND OF THE INVENTION

1. Field of the Invention

The present invention relates to printers.

In this specification, the term control character in a narrow sense shall be used to indicate ordinary control characters other than one or more characters subsequent to an escape character, and the term control character in a broad sense shall be used to indicate characters including control characters in a narrow sense and one or more characters subsequent to an escape character. The term "control character" used in the claims for the patent is the control character in a broad sense.

2. Description of the Prior Art

In order to print data output from a plurality of host computers, a printer system in which a plurality of host computers are connected to one printer through a plurality of host interfaces has been already developed.

In this type of printer system, when data is sent to the printer from each of the host computers at a time which differs for each host computer, the data can be normally printed. On the other hand, when data are simultaneously sent from two or more host computers, the data from the two or more host computers are mixed with each other because parallel processing is not performed, so that the data cannot be normally printed out.

An object of the present invention is to provide a printer capable of normally printing out, even when data are simultaneously sent to the printer from two or more host computers, the data.

Meanwhile, in a printer comprising a lot of functions, an escape character (ESC) is frequently used so as to diversify a control instruction in addition to independent ordinary control characters. The escape character is a character indicating that the succeeding one or more characters have different meanings from those of the ordinary control characters.

The meanings of the one or more characters subsequent to the escape character are not unified by manufacturers. Therefore, a printer comprising only a printing program corresponding to a command system for a particular manufacturer is not normally operated when a host computer made by another manufacturer is connected thereto.

In order to cause one printer to have general-purpose properties, therefore, a printer comprising a plurality of printing programs respectively corresponding to a plurality of command systems which differ in the meanings of one or more characters subsequent to an escape character and capable of selecting a printing program adaptable to a command system which a host computer as a sending source uses out of the printing programs by an operator operating a command system selecting key has been developed.

The above described printer has the disadvantage of requiring a laborious operation because the operator must select the program adaptable to the command system which the host computer as a sending source uses as well as not being normally operated when the operator erroneously performs the selecting operation.

An object of the present invention is to provide, in a printer comprising a plurality of printing programs respectively corresponding to a plurality of command systems which differ in the meanings of one or more characters subsequent to an escape character, a printer capable of automatically selecting a printing program adaptable to a command system which a host apparatus as a sending source uses.

SUMMARY OF THE INVENTION

In a printer to which a plurality of host interfaces for connecting a plurality of host apparatuses are connected, a first printer according to the present invention is characterized by comprising means for starting the acceptance of, when data is sent from an arbitrary host interface out of the above described plurality of host interfaces, the data as well as inhibiting the acceptance of data from the other host interfaces; judging means for judging that the acceptance of data corresponding to all pages sent from the above described arbitrary host interface, from which data first began to be accepted, is terminated; and means for releasing a state where the acceptance of the data from the above described other host interfaces (from which data are inhibited from being accepted) is inhibited when it is judged that the acceptance of the data corresponding to all the pages sent is terminated.

The above described judging means judges, when an interval at which data are received reaches not less than a predetermined reference time, for example, that the acceptance of the data corresponding to all the pages sent is terminated.

In the first printer according to the present invention, when the data is sent from the arbitrary host interface out of the plurality of host interfaces for connecting the plurality of host apparatusses, the acceptance of the data is started, and the acceptance of the data from the other host interfaces is inhibited. If it is judged that the acceptance of the data corresponding to all the pages sent is terminated, the state where the acceptance of the data from the above described other host interface (from which data are inhibited from being accepted) is inhibited is released.

In the first embodiment according to the present invention, even when data are simultaneously sent from two or more host computers, it is possible to normally print out the data.

A second embodiment according to the present invention for performing printing processing on the basis of data sent from a host apparatus and including control characters having one or more characters subsequent to an escape character is characterized by comprising first storing means for storing a plurality of printing programs corresponding to a plurality of command systems which employ different meanings for one or more characters subsequent to an escape character; second storing means for storing for each command system the presence or absence of each of at least those control characters other than the control characters which are common to all the command systems out of all control characters used in the above described plurality of command systems; judging means for judging which of the above described plurality of command systems is a command system in which each of the control characters included in the data sent from the above described host apparatus exists on the basis of data stored in the above described second storing means, to judge which of the above described plurality of command systems 1s a command system to which the data sent from the above described host apparatus belongs; and selecting means for selecting a printing program corresponding to the command system to which it is judged that the data sent from the above described host apparatus belongs.

It is preferable to provide indicating means for indicating which of the above described plurality of command systems corresponds to the selected printing program.

There is provided third storing means for storing priorities assigned to the above described plurality of command systems. With this third storing means above described second storing means stores for each command system the presence or absence of each of all the control characters used in the above described plurality of command systems. Then, the above described judging means may be one for judging, when the number of command systems which are not excluded from objects to be selected is determined to be one (as a result of judging whether or not one of the control characters included in the data sent from the above described host apparatus exists in the above described command systems selected in ascending order of priorities, and excluding from the objects to be selected a command system in which it is judged that the above described control character does not exist) that the one command system is a command system to which the data sent from the above described host apparatus belongs. Then judging means may further judge, when the number of command systems which are not excluded from the objects to be selected is two or more (as a result of judging whether or not the above described control character exists in each of all the command systems) whether or not the other control character included in the data sent from the host apparatus exists in each of the command systems remaining as the objects to be selected.

It may be judged, when the number of command systems which are not excluded from the objects to be selected is two or more (as a result of judging whether or not each of control characters in a required amount of received data exists in each of the above described command systems) that the command system assigned the higher priority out of the command systems which are not excluded from the objects to be selected is a command system to which the data sent from the above described host apparatus belongs.

The above described required amount of received data are, for example, received data stored in a receiving buffer after the receiving is started and corresponding to the capacity of the receiving buffer, when the amount of data corresponding to all pages sent is not less than the capacity of the receiving buffer. Alternatively, the required amount of received data is the received data stored in the receiving buffer after the receiving is started and corresponding to all the pages sent, when the amount of the data corresponding to all the pages sent is less than the capacity of the receiving buffer. Judgment whether or not the receiving of the data corresponding to all the pages sent is terminated is made depending on, for example, whether or not an interval at which data are received is not less than a predetermined reference time. This reference time is set by, for example, reference time setting means.

It is preferable to provide input means for setting the above described priorities. In addition, there may be provided means for automatically altering, when the selected printing program is not one assigned the highest priority, the priority assigned to the selected printing program and the priority assigned to a printing program currently assigned the highest priority.

Furthermore, there may be provided input means for setting, when a plurality of host interfaces for simultaneously connecting a plurality of host apparatuses are connected to the above described printer, the above described priorities for each host interface.

In the second printer according to the present invention, the plurality of printing programs corresponding to the plurality of command systems which differentiate in the meanings of the one or more characters subsequent to the escape character are stored in the first storing means. In addition, the second storing means stores, for each command system, the presence or absence of each of at least the control characters other than the control characters which are common to all the command systems out of all the control characters used in the above described plurality of command systems.

When the data is sent from the host apparatus, it is judged, on the basis of the data stored in the second storing means, which of the plurality of command systems is a command system in which each of the control characters (control characters including one or more characters subsequent to an escape character or ordinary control characters in a narrow sense) included in the data sent from the host apparatus exists, to thereby judge which of the above described command systems is a command system to which the data sent from the host apparatus belongs. A printing program corresponding to the command system to which it is judged that the data sent from the host apparatus belongs is then selected, to execute printing processing by the selected printing program.

In the second printer according to the present invention, a printing program adaptable to a command system which the host apparatus as a sending source uses is automatically selected.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Description is now made of an embodiment of the present invention with reference to the drawings.

Figure 1:
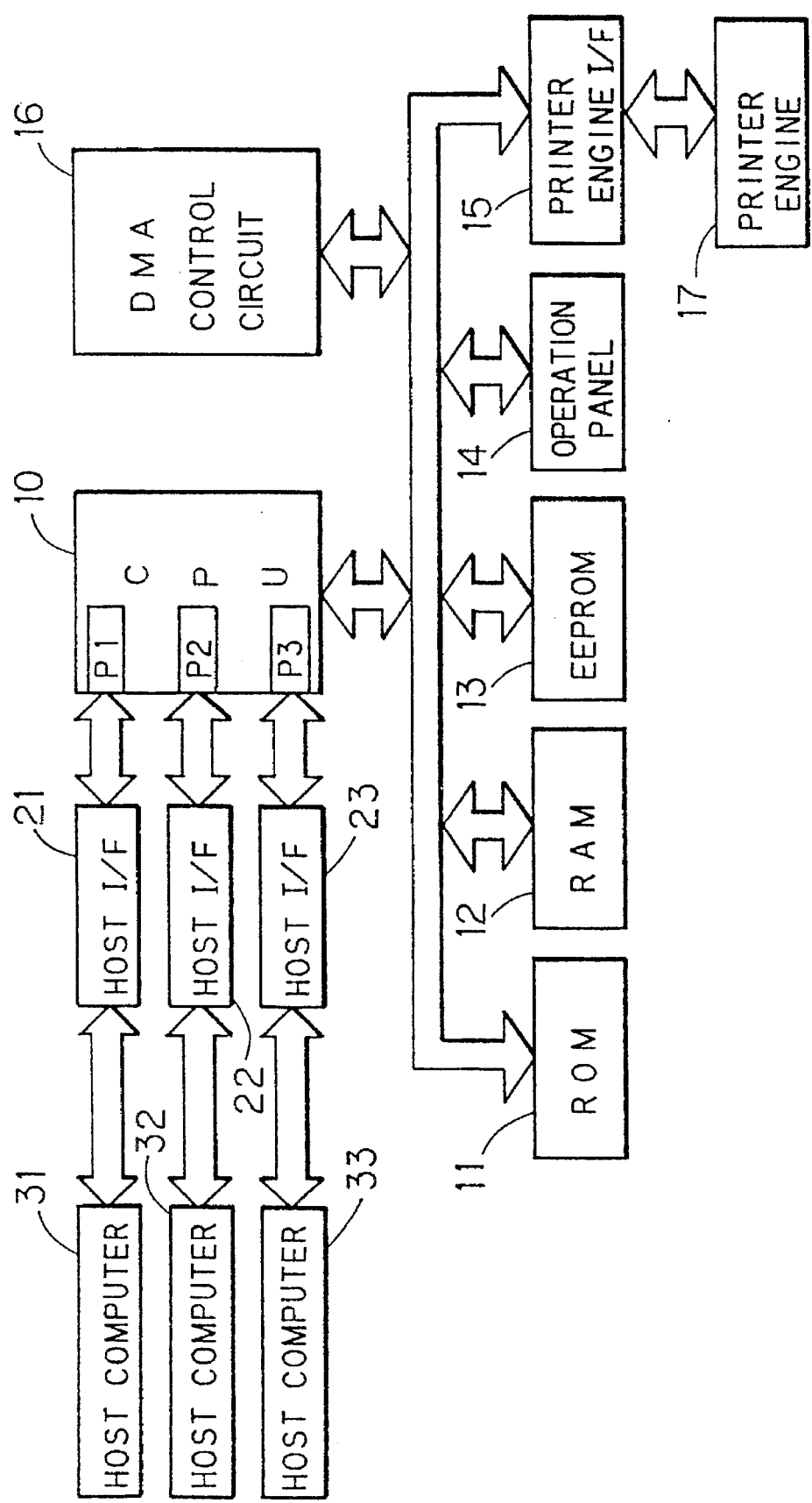
FIG. 1 is a block diagram showing the construction of a printer system.

FIG. 1 illustrates the whole construction of a printer system.

A printer is controlled by a CPU (Central Processing Unit) 10. A ROM (Read Only Memory) 11, a RAM (Random Access Read Write Memory) 12, an EEPROM (Electrically Erasable Programmable ROM) 13, an operation panel 14, a printer engine interface 15, and the like are connected to the CPU 10 through a bus. A DMA (Direct Memory Access)

control circuit 16 is further connected to the above described bus. A printer engine 17 is connected to the printer engine interface 15.

Programs for the CPU 10 and other data are stored in the ROM 11. The programs include a plurality of printing programs corresponding to a plurality of command systems which differ in the meanings of one or more characters subsequent to an escape character. It is assumed that a plurality of printing programs, respectively corresponding to command systems for the A company, the B company and the C company which differ in the meanings of one or more characters subsequent to an escape character, are stored in the ROM 11.

Necessary data are stored in the RAM 12. Predetermined set contents are stored in the EEPROM 13. The operation panel 14 comprises various operation keys such as a reference time setting key and a priority setting key, a display and the like.

Three host computers 31, 32 and 33 are connected to the CPU 10 through three host interfaces 21, 22 and 23. The host interfaces 21, 22 and 23 are respectively connected to a P1 port, a P2 port and a P3 port in the CPU 10.

Table 1, Table 2, and Table 3 respectively show control character tables used in the command systems for the A company, the B company and the C company.

TABLE 1

CONTROL CHARACTER TABLE USED IN COMMAND SYSTEM FOR A COMPANY

| NULL | NULL | NULL | NULL | NULL | NULL | NULL | NULL |
|---|---|---|---|---|---|---|---|
| BS | HT | LF | VT | FF | CR | SO | SI |
| NULL | DC1 | DC2 | DC3 | DC4 | NULL | NULL | NULL |
| CAN | NULL | NULL | NULL | NULL | NULL | NULL | NULL |
| NULL | NULL | NULL | NULL | NULL | NULL | NULL | NULL |
| NULL | NULL | NULL | NULL | NULL | NULL | NULL | NULL |
| NULL | NULL | NULL | NULL | NULL | NULL | NULL | NULL |
| NULL | NULL | NULL | NULL | NULL | NULL | NULL | NULL |
| SP | NULL | NULL | NULL | NULL | NULL | NULL | NULL |
| NULL | NULL | * | NULL | NULL | — | NULL | MULL |
| 0 | 1 | 2 | 3 | 4 | 5 | 6 | 7 |
| NULL | 9 | : | NULL | NULL | = | NULL | NULL |
| NULL | A | B | C | D | E | F | G |
| H | I | J | K | L | NULL | N | NULL |
| P | Q | R | S | T | U | NULL | W |
| X | Y | Z | [ | \ | NULL | ^ | — |
| NULL | NULL | NULL | NULL | d | NULL | NULL | NULL |
| NULL | NULL | j | NULL | NULL | NULL | NULL | NULL |
| NULL | NULL | NULL | NULL | NULL | NULL | NULL | NULL |
| NULL | NULL | NULL | NULL | NULL | NULL | NULL | NULL |

TABLE 2

CONTROL CHARACTER TABLE USED IN COMMAND SYSTEM FOR B COMPANY

| NULL | NULL | NULL | NULL | NULL | NULL | NULL | NULL |
|---|---|---|---|---|---|---|---|
| BS | HT | LF | VT | FF | CR | SO | SI |
| NULL | DC1 | DC2 | DC3 | DC4 | NULL | NULL | NULL |
| CAN | NULL | NULL | NULL | NULL | NULL | NULL | NULL |
| NULL | NULL | NULL | NULL | NULL | NULL | NULL | NULL |
| NULL | NULL | NULL | NULL | NULL | NULL | SO | SI |
| NULL | NULL | NULL | NULL | NULL | NULL | NULL | NULL |
| NULL | EM | NULL | NULL | NULL | NULL | NULL | NULL |
| SP | ! | NULL | # | $ | NULL | NULL | NULL |
| ( | NULL | * | + | NULL | — | NULL | / |
| 0 | 1 | 2 | 3 | 4 | 5 | 6 | 7 |
| NULL | NULL | : | NULL | < | = | > | ? |
| @ | A | B | C | D | E | F | G |
| H | NULL | J | K | L | M | N | O |
| P | Q | R | S | T | U | V | W |
| NULL | Y | Z | NULL | \ | NULL | NULL | NULL |
| NULL | a | b | NULL | NULL | NULL | NULL | g |
| NULL | NULL | NULL | k | l | NULL | NULL | NULL |
| p | NULL | NULL | NULL | t | NULL | NULL | w |
| x | NULL | NULL | NULL | NULL | NULL | NULL | DEL |

TABLE 3

CONTROL CHARACTER TABLE USED IN COMMAND SYSTEM FOR C COMPANY

| | | | | | | | |
|---|---|---|---|---|---|---|---|
| NULL | NULL | NULL | NULL | NULL | NULL | NULL | NULL |
| BS | HT | LF | NULL | FF | CR | SO | SI |
| NULL | NULL | NULL | NULL | NULL | NULL | NULL | NULL |
| NULL | NULL | NULL | MULL | NULL | NULL | NULL | NULL |
| NULL | NULL | NULL | NULL | NULL | NULL | NULL | NULL |
| NULL | NULL | NULL | NULL | NULL | NULL | SO | SI |
| NULL | NULL | NULL | NULL | NULL | NULL | NULL | NULL |
| NULL | NULL | NULL | NULL | NULL | NULL | NULL | NULL |
| SP | NULL | NULL | NULL | NULL | % | & | NULL |
| ( | ) | * | NULL | NULL | NULL | NULL | NULL |
| NULL | NULL | NULL | NULL | NULL | NULL | NULL | NULL |
| NULL | 9 | NULL | NULL | NULL | = | NULL | NULL |
| MULL | NULL | NULL | NULL | NULL | E | NULL | NULL |
| NULL | NULL | NULL | NULL | NULL | NULL | NULL | NULL |
| NULL | NULL | NULL | NULL | NULL | NULL | NULL | NULL |
| NULL | Y | Z | NULL | NULL | NULL | NULL | NULL |
| NULL | NULL | NULL | NULL | NULL | NULL | NULL | NULL |
| NULL | NULL | NULL | NULL | NULL | NULL | NULL | NULL |
| NULL | NULL | NULL | NULL | NULL | NULL | NULL | NULL |
| NULL | NULL | NULL | NULL | NULL | NULL | NULL | NULL |

In each of the control character tables, the upper four lines indicate control characters in the narrow sense, and the fifth line and the subsequent lines indicate characters used subsequently to an escape character. In the control character table, "NULL" indicates that no character exists.

Furthermore, a character which can be used for each position (code number) in each of the control character tables is determined. However, the characters used subsequently to the escape character differ in the meanings from company to company.

As can be seen from the control character tables for the respective companies, even in the same position, a character exists in the control character table for some company, while no character exists in the control character table for another company. For example, in the first column of the last line, a character "x" exists in the control character table for the B company, while no character exists in the control character tables for the A company and the C company.

Figure 2:
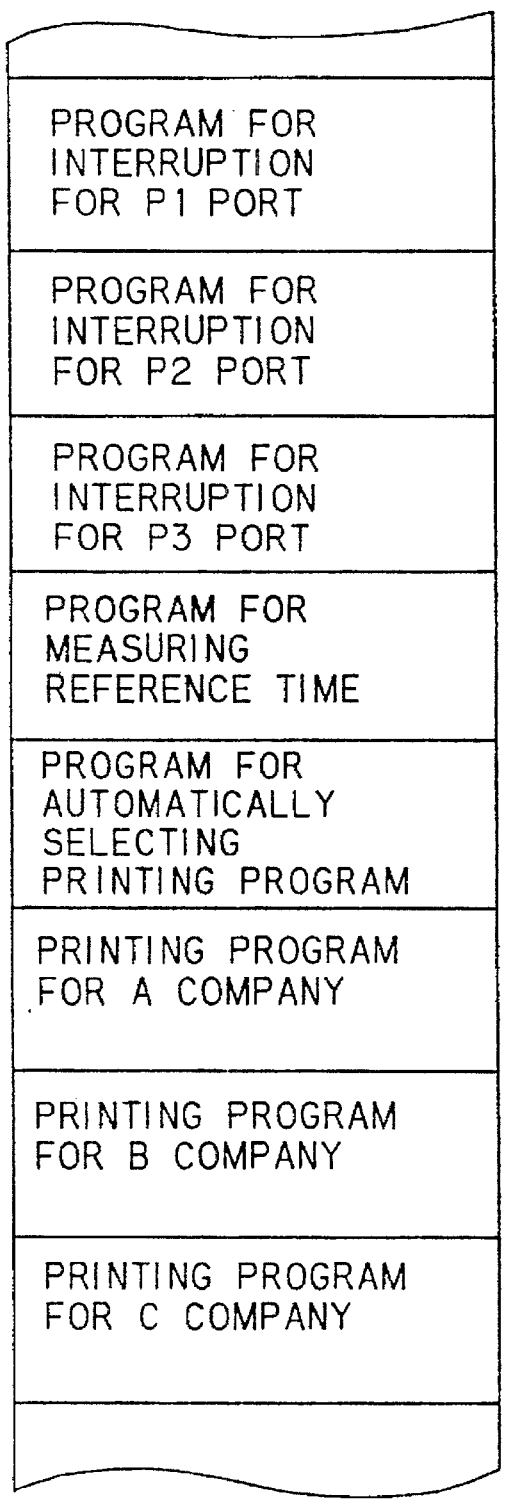
FIG. 2 is a diagram showing a part of the contents of a ROM 11.
Figure 2:
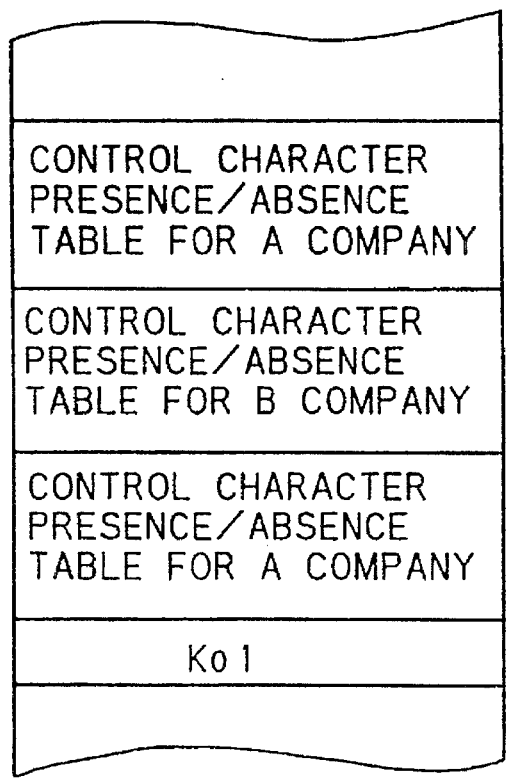

FIG. 2 shows a part of the contents of the ROM 11.

The ROM 11 stores programs for interruption for input ports, for respectively storing data from the host computers 31, 32 and 33 in a receiving buffer; a program for measuring reference time used for judging whether or not the receiving of data corresponding to all pages sent is completed; a program for automatically selecting printing programs for the A company, the B company and the C company which are adaptable to receive data; a plurality of printing programs corresponding to command systems for the A company, the B company and the C company, and the like.

Furthermore, the ROM 11 is provided with control character presence/absence tables which store, for each company, data indicating the presence or absence each of all control characters (which are control characters in a broad sense, that is, include characters subsequent to an escape character and control characters in a narrow sense) used in the control character tables for the A company, the B company and the C company. In addition, the ROM 11 stores a reference value Ko1 used for judging whether or not the amount of data sent after the receiving has started reaches the capacity of the receiving buffer.

Figure 3:
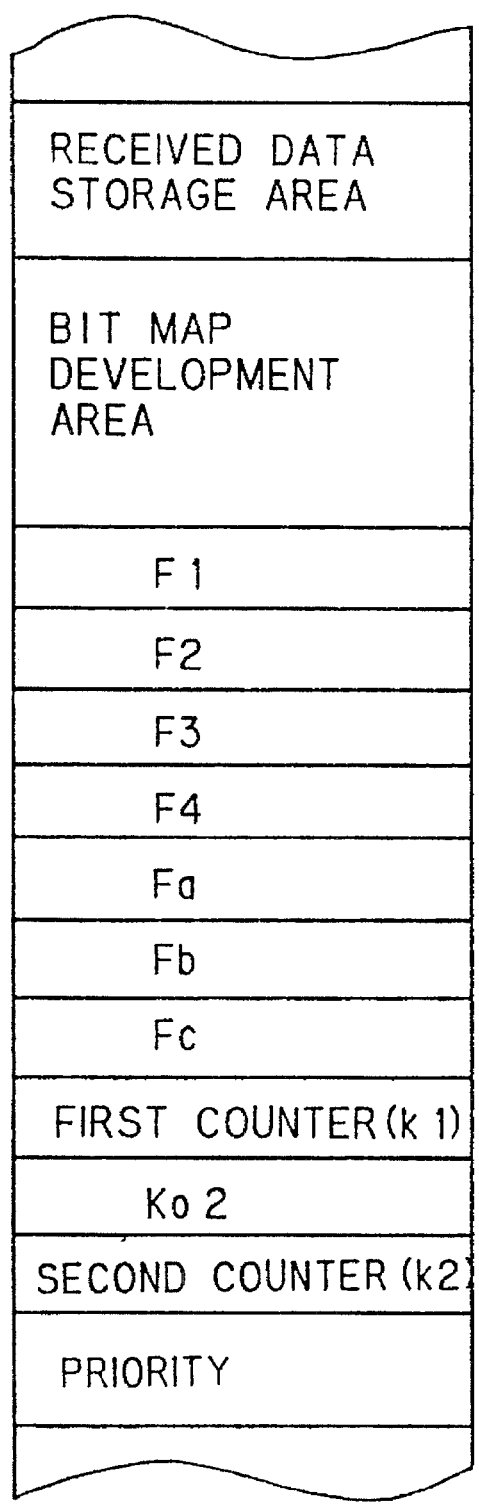
FIG. 3 is a diagram showing a part of the contents of a RAM 12.

FIG. 3 shows a part of the contents of the RAM 12.

The RAM 12 is provided with a received data storage area used as a receiving buffer, a bit map development area used as a bit map memory, an area used as a flag for judging exclusive control F1, an area used as a flag for indicating that a receiving buffer is full F2, an area used as a flag indicating that all ports are in a receiving inhibited state F3, an area used as a flag for judging the termination sending F4, an area used as a flag for indicating that a command system for the A company is excluded from objects to be selected Fa, an area used as a flag for indicating that a command system for the B company is excluded from objects to be selected Fb, a flag for indicating that a command system for the C company is excluded from objects to be selected Fc, an area used as a counter (first counter) for counting the amount of data received (the number of times of receiving of data corresponding to one word), an area for storing a reference value Ko2 corresponding to reference time, an area used as a counter (second counter) for measuring the reference time, an area for storing priorities assigned to the command systems for the A company, the B company and the C company, and the like.

The flag for judging exclusive control F1 is a flag for indicating that only one of the P1, P2 and P3 ports in the CPU 10 is in an interrupt enable state. The flag for indicating that a receiving buffer is full F2 is a flag for indicating that the amount of data sent after the receiving has started reaches the capacity of the receiving buffer. The flag for indicating that all ports are in a receiving inhibited state F3 is a flag for indicating that all of the P1, P2 and P3 ports in the CPU 10 are in an interrupt disable state. The flag for judging the termination of sending F4 is a flag for indicating that the receiving of data corresponding to all pages sent is terminated.

The flag for indicating that a command system for the A company is excluded from objects to be selected Fa is a flag for indicating that a command system for the A company is excluded from objects to be selected in the process of executing processing for automatically selecting printing programs as described later. The flag for indicating that a command system for the B company is excluded from objects to be selected Fb is a flag for indicating that a command system for the B company is excluded from objects to be selected in the process of executing processing for automatically selecting printing programs. The flag for indicating that a command system for the C company is excluded from objects to be selected Fc is a flag for indicating that a command system for the C company is excluded from objects to be selected in the process of executing processing for automatically selecting printing programs.

The respective flags F1, F2, F3, F4, Fa, Fb and Fc as well as the respective counters k1 and k2 are reset (set to "0") during initialization after turning on the power supply.

The reference time can be set to, for example, an arbitrary time at intervals of five seconds within the range of 5 to 55 seconds using the reference time setting key provided for in the operation panel 14 by an operator.

Priorities assigned to the command systems for the A company, the B company and the C company are set by the priority setting key provided for in the operation panel 14. It is assumed here that the order of descending priorities is the A company, the B company, and the C company.

Figure 4:
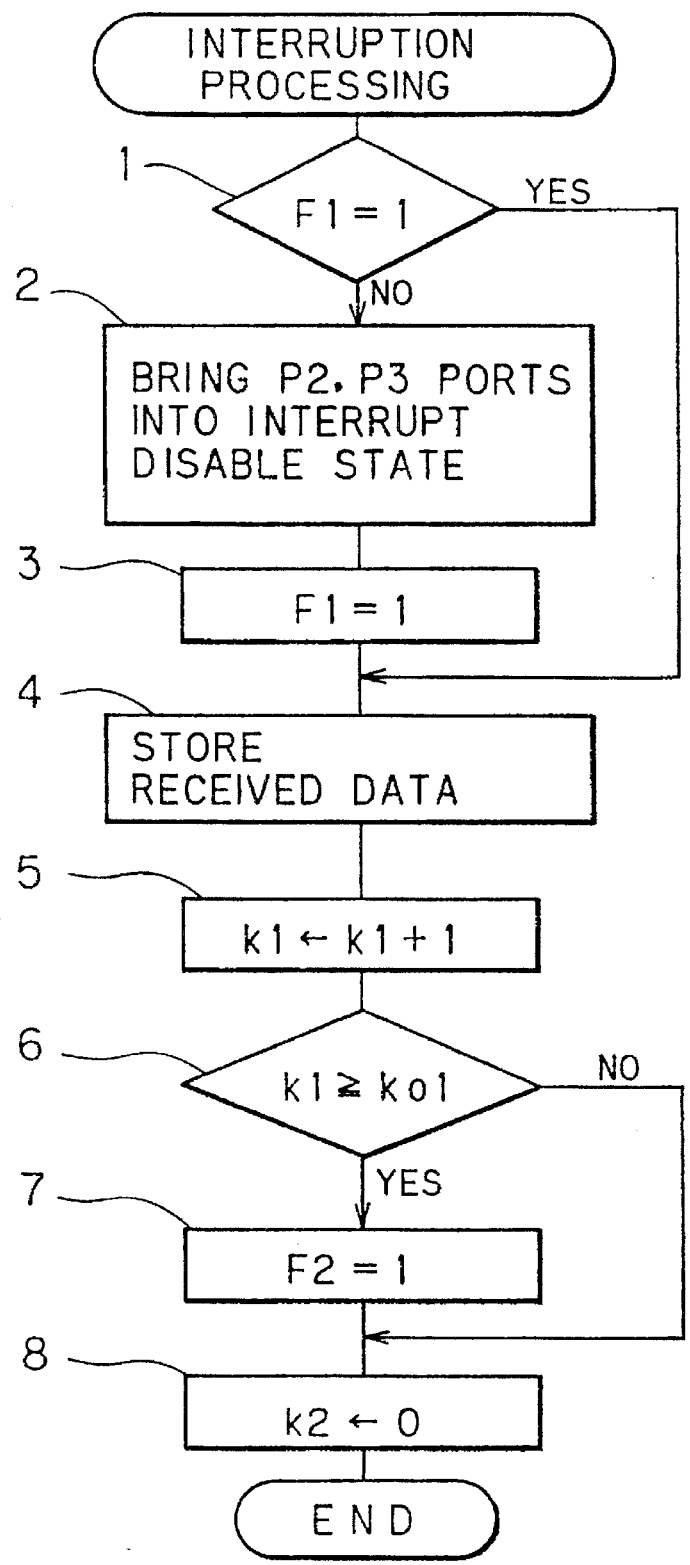
FIG. 4 is a flow chart showing interruption processing executed by a CPU 10.

FIG. 4 shows interruption processing for the P1 port in a case where data is sent to the P1 port in the CPU 10 through the host interface 21 from the host computer 31.

Figure 5:
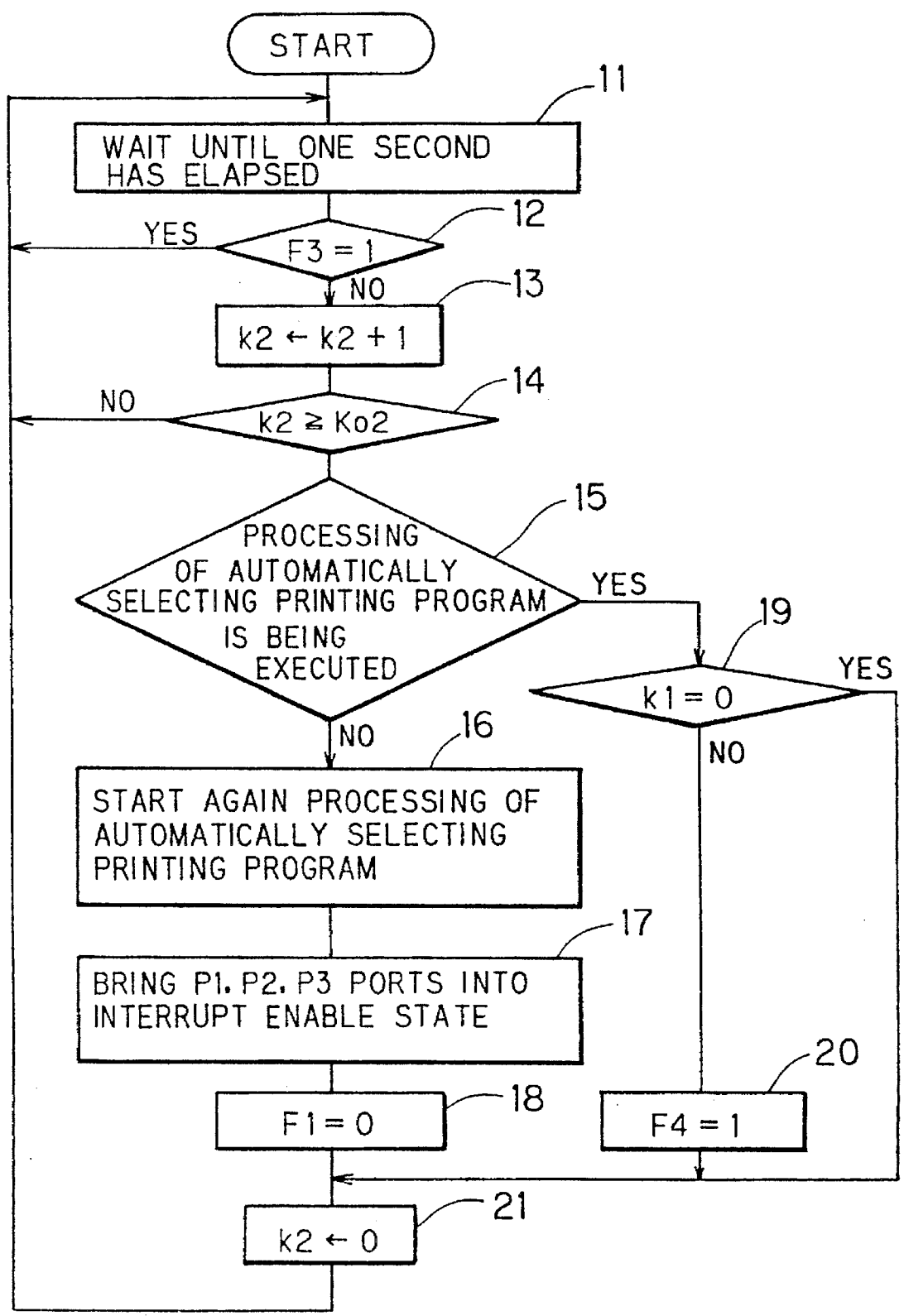
FIG. 5 is a flow chart showing the processing of measuring reference time executed by the CPU 10.

FIG. 5 shows the processing for measuring reference time always executed by the CPU 10.

Figure 6A:
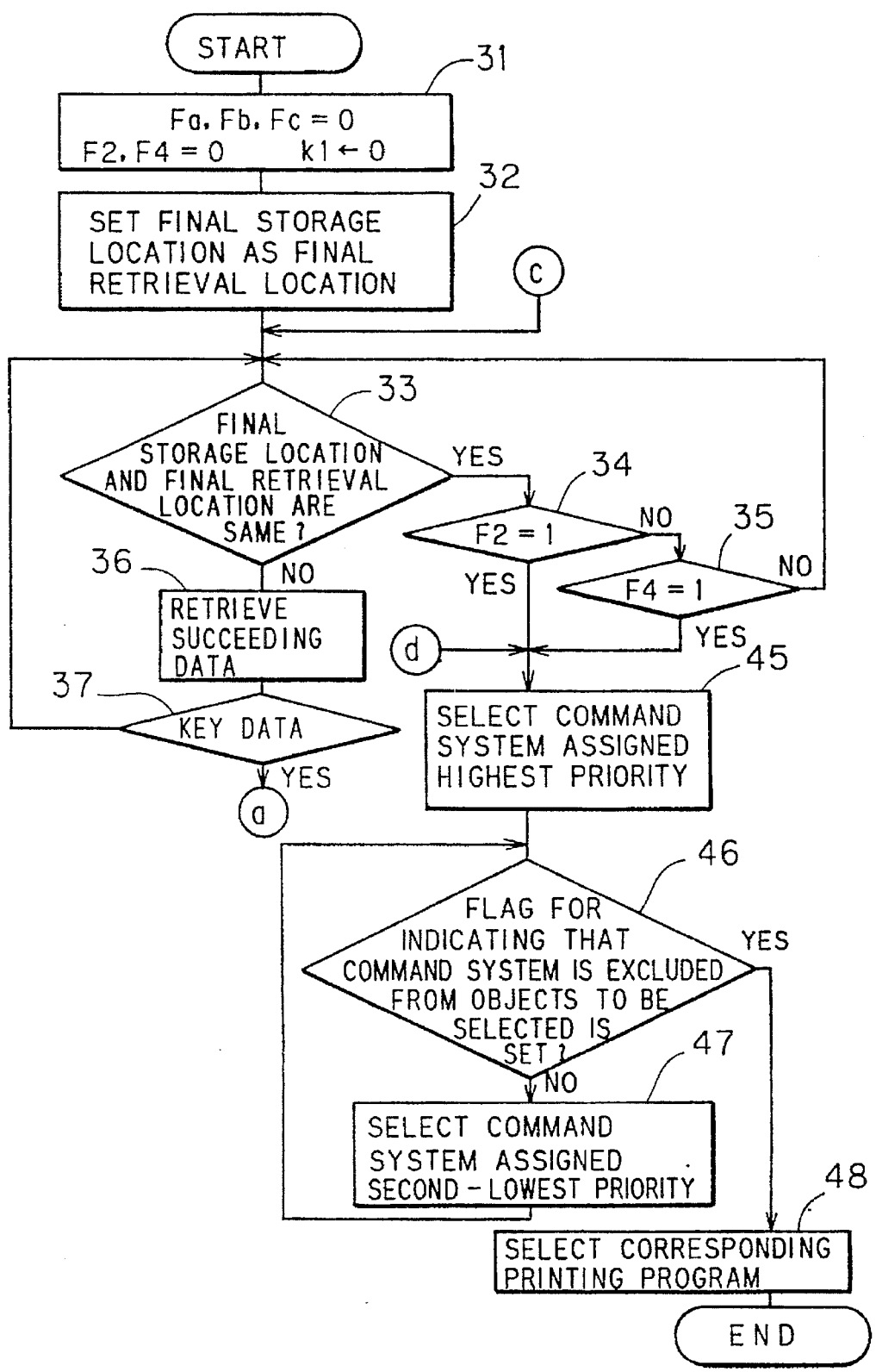
FIGS. 6a and 6b are flow charts showing the processing of automatically selecting printing programs executed by the CPU 10.
Figure 6B:
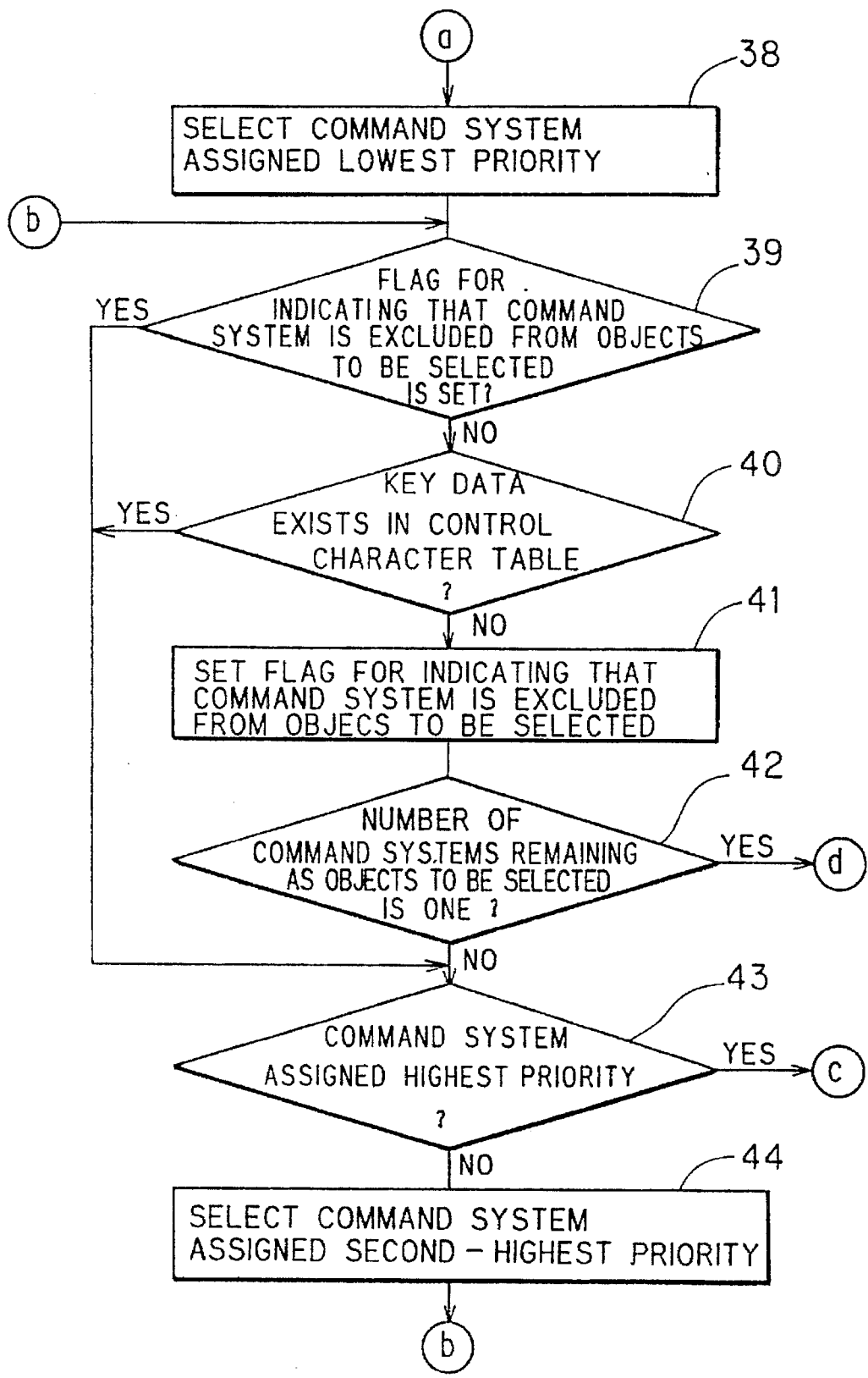

FIGS. 6a and 6b show processing of automatically selecting printing programs executed by the CPU 10.

Description will now be made of the interruption processing for the P1 port. When data corresponding to one word is sent to the P1 port in the CPU 10 through the host interface 21 from the host computer 31, a BUSY state signal is sent to the host computer 31 and it is judged whether or not the flag for judging exclusive control F1 is set (F1=1) (step 1). If the flag for judging exclusive control F1 is not set (F1=0), it is judged that all of the P1, P2 and P3 ports are in an interrupt enable state, so that the B port and the C port are brought into an interrupt disable state (step S2). In addition, the flag for judging exclusive control F1 is set so as to indicate that only the P1 port out of the P1, P2 and P3 ports in the CPU 10 is in an interrupt enable state (F1=1) (step 3).

The received data corresponding to one word is then stored in the received data storage area in the RAM 12, so that the BUSY state is released (step 4). On the other hand, if the flag for judging exclusive control F1 is set (F1=1) in the above described step 1, it is judged that only the P1 port out of the P1, P2 and P3 ports in the CPU 10 is in an interrupt enable state, so that the program proceeds to the above described step 4 without performing the above described processing in steps 2 and 3. In step 4, the received data is stored in the received data storage area in the RAM 12, so that the BUSY state is released.

When the received data is stored in the received data storage area in step 4, a counted value k1 of the first counter (for counting the amount of data received) is incremented (step 5). That is, the content k1 of the area used as the first counter in the RAM 12 is increased by one. It then is judged whether or not the updated value k1 reaches the predetermined reference value Ko1 (step 6).

If the counted value k1 of the first counter reaches the reference value Ko1 (K1≧Ko1), it is judged that the amount of the received data reaches the capacity of the receiving buffer (the received data storage area in the RAM 12), so that the flag indicating that the receiving buffer is full F2 is set (F2=1) (step 7). The second counter for measuring reference time then is reset (step 8). That is, the content k2 of the area used as the second counter in the RAM 12 is set to "0".

On the other hand, when the counted value k1 of the first counter does not reach the reference value Ko1 in the above described step 6 (k1<Ko1), the program proceeds to the step 8 without setting the flag for indicating that the receiving buffer is full F2, so that the second counter is still reset.

When data is sent to the P2 port in the CPU 10 through the host interface 22 from the host computer 32, the same interruption processing for the P2 port as that shown in FIG. 4 is performed. In this case, however, the P1 and P3 ports are brought into an interrupt disable state in step 2. Furthermore, when data is sent to the P3 port in the CPU 10 through the host interface 23 from the host computer 33, the same interruption processing for the P3 port as that shown in FIG. 4 is performed. In this case, however, the P1 and P2 ports are brought into an interrupt disable state in step 2.

Description is made of the processing of measuring reference time shown in FIG. 5. In this processing, when the power supply is turned on, the program first waits until one second has elapsed (step 11). When one second has elapsed, it is judged whether or not the flag for indicating that all ports are in a receiving inhibited state F3 is set (F3=1) (step 12). The flag for indicating that all ports are in a receiving inhibited state F3 is a flag for indicating that each of the P1, P2 and P3 ports in the CPU 10 are in an interrupt disable state. This flag for indicating that all ports are in a receiving inhibited state F3 is set (F3=1) when the receiving of data from all of the P1, P2 and P3 ports to the printer is inhibited in cases such as where printing is being done, a case where a cover of the printer is opened, and a case where there remain no paper sheets, while being reset (F3=0) when the states are avoided.

If the flag for indicating that all ports are in a receiving inhibited state F3 is not set (F3=0), the counted value k2 of the second counter for measuring reference time is incremented (step 13). That is, the content k2 of the area used as the second counter in the RAM 12 is incremented by one. On the other hand, if the flag for indicating that all ports are in a receiving inhibited state F3 is set (F3=1), the receiving of data from all of the P1, P2 and P3 ports is inhibited, so that the program is returned to the above described step 11 without performing a counting operation so as not to measure time during the inhibition. The above described processing in the steps 11 and 12 is repeated until the flag for indicating that all ports are in a receiving inhibited state F3 is reset.

When the counted value k2 is updated in the step 13, it is judged whether or not the counted value k2 updated reaches a predetermined reference value Ko2 (step 14). If the counted value k2 of the second counter does not reach the reference value Ko2 (K2<Ko2), the program is returned to the step 11. The above described processing in the steps 11 to 14 is repeated.

On the other hand, if the counted value k2 reaches the reference value Ko2 (K2≧Ko2), it is judged whether or not the processing of automatically selecting printing programs is being executed (step 15). When the processing of automatically selecting printing programs is not being executed, that is, when the preceding processing of automatically selecting printing programs is terminated, the processing of automatically selecting printing programs is started again so that the processing of automatically selecting printing programs is executed for the succeeding received data (step 16).

Furthermore, all of the P1, P2 and P3 ports are brought into an interrupt enable state (step 17) and then, the flag for judging exclusive control F1 is reset (F1=0) (step S18). After the second counter is reset (step 21), that is, the content k2 of the area used as the second counter in the RAM 12 is set to "0", the program is returned to the step 11.

Consequently, when the reference time has elapsed from the time when the second counter is reset in step 8 after the P2 and P3 ports are brought into an interrupt disable state in the step 2 in the interruption processing for the P1 port until the second counter is reset again in step 8 by the sending of the succeeding received data corresponding to one word, the P2 and P3 ports are brought into an interrupt enable state.

More specifically, the P1, P2 and P3 ports are always in an interrupt enable state. If data is sent to any one of the ports, the other ports are brought into an interrupt disable state. When the receiving of data corresponding to all pages sent is terminated, all the P1, P2 and P3 ports are brought into the interrupt enable state. Judgment of whether or not the receiving of the data corresponding to all the pages sent is terminated is made by judging whether or not, within the reference time elapsed from the time when the receiving of data is interrupted, succeeding data is received. It is judged that the receiving of the data corresponding to all the pages sent is terminated when, within reference time elapsed from the time when the receiving of data is interrupted, succeeding data is not received.

When data is sent to the other port, for example, the P2 port while the interruption processing for the P1 port is being executed, the data is held in the P2 port without being accepted therein because the P2 port is in an interrupt disable state. In this case, the BUSY state signal is sent to the host computer 32, so that succeeding data is not sent to the P2 port. The BUSY state is released after the data held in the P2 port is accepted.

The BUSY state signal may be sent to the host computers 32 and 33 corresponding to the P2 and P3 ports in place of bringing the P2 and P3 ports into an interrupt disable state in the above described step 2, and the BUSY state of all the host computers 31, 32 and 33 may be released in place bringing all the ports P1, P2 and P3 into an interrupt enable state in the above described step 17. Also, in this case, the BUSY state signal is sent to the sending source when data is sent to each of the ports, and the BUSY state of the sending source is released when the data is accepted.

When the processing of automatically selecting printing programs is being executed in the above described step 15, it is judged whether or not the counted value k1 of the first counter is zero (step 19). When the counted value k1 of the first counter is zero (k1=0), it is judged that data is not sent to the CPU 10 from the host computer 31, 32 or 33, although the processing of automatically selecting printing programs is started, so that the second counter is reset (step 21) and then, program is returned to step 11.

On the other hand, when the counted value k1 of the first counter is not zero, that is, it is one or more, it is judged that the receiving of the data corresponding to all the pages sent is terminated, so that the flag for judging the termination of sending F4 is set (F4=1) (step 20). The second counter is reset (k2=0) (step 21) and then, the program is returned to the step 11.

Description will now be made of the processing of automatically selecting printing programs shown in FIGS. 6a and 6b. This processing is executed when the power supply is turned on and when the processing of automatically selecting printing programs is started again in step 16 during the processing of measuring the reference time.

In this processing, the flags for indicating that a command system is excluded from objects to be selected Fa and Fb and Fc, the flag for indicating that a receiving buffer is full F2, the flag for judging the termination of sending F4, and the first counter are reset (step 31). A storage location within the received data storage area in the RAM 12 into which finally received data is written (final storage location) is set as a final retrieval location (step 32).

Processing of selecting key data for judging a command system then is executed. That is, it is judged whether or not the storage location into which finally received data is written (final storage location) and a storage location finally retrieved out of the storage locations already retrieved so as to select key data (final retrieval location) are the same (step 33).

When the final storage location and the final retrieval location are the same, it is judged whether or not the flag for indicating that a receiving buffer is full F2 (used for indicating that the amount of data received after the receiving is started reaches the capacity of the received data storage area) is set (step 34). If the flag for indicating that a receiving buffer is full F2 is not set (F2=0), it is judged whether or not the flag for judging the termination of sending F4 (used for indicating that the receiving of data corresponding to all pages sent is terminated) is set (step 35). If the flag for judging the termination of sending F4 is not set (F4=0), the program is returned to the step 33.

In a state where data is not sent after the processing of automatically selecting printing programs is started, the final storage location is set as the final retrieval location in the above described step 32, so that the inquiry is answered in the affirmative in the above described step 33, answered in the negative in the above described step 34, and answered in the negative in the above described step 35. Consequently, the above described processing in the steps 33, 34 and 35 is repeated until data is sent after the processing of automatically selecting printing programs is started.

When data is sent after the processing of automatically selecting printing programs is started so that the received data is stored in the received data storage area in the RAM 12, the final storage location is changed. Accordingly, the final storage location and the final retrieval location do not coincide with each other, so that the inquiry is in the negative in the above described step 33. Consequently, data in a storage location subsequent to the current final retrieval location within the received data storage area in the RAM 12 is retrieved (step 36). It is judged whether or not the data retrieved is key data for judging a command system (step 37). That is, it is judged whether or not the retrieved data is a control character (any one of control characters in a broad sense which include characters subsequent to an escape character and control characters in a narrow sense).

If the retrieved data is not key data, the program is returned to the above described step 33. On the other hand, if the retrieved data is key data, processing of selecting command systems based on this key data is executed. That is, a command system assigned the lowest priority, the command system for the C company in this example is first selected as an object to be judged (step 38).

It is judged whether or not the command system for the C company is excluded from the objects to be selected on the basis of the state of the flag for indicating that a command system is excluded from objects to be selected for the selected company, the flag Fc in this example (step 39). If the command system for the C company is not excluded from the objects to be selected (Fc=0), it is judged whether or not the key data selected exists in the control character table for the C company (step 40). That is, it is judged whether or not the selected key data exists in the control character table for the C company by referring to an area, corresponding to the key data, in the control character presence/absence table for the C company in the ROM 11.

If the selected key data does not exist in the control character table for the C company, the command system for the C company is excluded from the objects to be selected (step 41). Specifically, the flag for indicating that a command system is excluded from objects to be selected for the C company Fc is set (Fc=1). It is judged whether or not the number of command systems remaining as objects to be selected is one on the basis of the states of the flags for indicating that a command system is excluded from objects to be selected for the A company, the B company and the C company Fa, Fb and Fc (step 42).

When the number of command systems remaining as objects to be selected is not one, that is, two or more, it is judged whether or not the command system currently selected as an object to be judged is the command system assigned the highest priority (step 43).

When it is judged in the above described step 39 that the command system is excluded from the objects to be selected or when it is judged in the above described step 40 that the key data exists in the control character table, the program proceeds to the steps 43. In the step 43, it is judged whether or not the command system currently selected as an object to be judged is a command system assigned the highest priority.

When the command system currently selected as an object to be judged is not the command system assigned the highest priority, a command system assigned a priority higher by one than that assigned to the command system currently selected as an object to be judged, the command system for the B company in this example, is selected as an object to be judged (step 44).

The program is returned to the step 39. In the step 39, it is judged whether or not the command system for the B company is excluded from the objects to be selected on the basis of the state of the flag for indicating that a command system is excluded from objects to be selected for the B company Fb. If the command system for the B company is not excluded from the objects to be selected (Fb=0), it is judged whether or not the key data selected exists in the control character table for the B company on the basis of the control character presence/absence table for the B company (step 40). When the selected key data does not exist in the control character table for the B company, the command system for the B company is excluded from the objects to be selected (step 41). Specifically, the flag for indicating that a command system is excluded from objects to be selected for the B company Fb is set (Fb=1).

It is judged whether or not the number of command systems remaining as objects to be selected is one (step 42). When the number of command systems remaining as objects to be selected is two or more (NO in the step 42), that is, at least one of the command systems for the C company and the B company is not excluded, when the command, system for the C company remains as an object to be selected and it is judged in the step 39 that the command system for the B company is excluded from the objects to be selected, or when it is judged in the above described step 40 that the key data exists in the control character table for the B company, it is judged whether or not the command system currently selected as an object to be judged is a command system assigned the highest priority (step 43).

If the command system currently selected is not a command system assigned the highest priority, a command system assigned the priority higher by one than that assigned to the command system currently selected, the command system for the A company in this example, is selected (step 44).

It is judged whether or not the command system for the A company is excluded from the objects to be selected on the basis of the state of the flag for indicating that a command system is excluded from objects to be selected for the A company Fa (step 39). If the command system for the A company is not excluded from the objects to be selected (Fa=0), it is judged whether or not the selected key data exists in the control character table for the A company on the basis of the control character presence/absence table for the A company (step 40). When the selected key data does not exist in the control character table for the A company, the command system for the A company is excluded from the objects to be selected (step 41). Specifically, the flag for indicating that a command system is excluded from objects to be selected for the A company Fa is set (Fa=1).

It is judged whether or not the number of command systems remaining as objects to be selected is one (step 42). When the number of command systems remaining as objects to be selected is two or more, when both the command systems for the C company and the B company remain as objects to be selected and it is judged in the above described step 39 that the command system for the A company is excluded from the objects to be selected, or when it is judged in the above described step 40 that the key data exists in the control character table for the A company, it is judged whether or not the command system currently selected as an object to be judged is a command system assigned the highest priority (step 43).

When the command system currently selected as an object to be judged is a command system assigned the highest priority, the program is returned to the step 33. In the step 33, it is judged whether or not the final storage location to which data finally received is written in the received data storage area in the RAM 12 and the final retrieval location out of storage locations already retrieved so as to select key data are the same.

When the final storage location of the received data and the final retrieval location are different from each other, that is, when data which has not been retrieved yet so as to select key data remains in the received data storage area, data in a storage location subsequent to the final retrieval location is retrieved (step 36). If the data retrieved is key data (step 37), the program proceeds to the step 38. Consequently, the above described processing of selecting command systems in the steps 38 to 44 is performed on the basis of the key data. On the other hand, if the data is not key data, the program is returned to the step 33.

When the final storage location of the received data and the final retrieval location are the same in the above described step 33, it is judged whether or not the amount of data received after the receiving is started reaches the capacity of the received data storage area on the basis of the state of the flag for indicating that a receiving buffer is full F2 (step 34).

When the flag for indicating that a receiving buffer is full F2 is set (F2=1), that is, when the amount of the data received after the receiving is started reaches the capacity of the received data storage area, it is judged that the number of command systems remaining as objects to be selected is two or more as a result of performing the processing of selecting command systems in the steps 38 to 44 for all key data in the received data corresponding to the capacity of the received data storage area after the receiving is started, so that the program proceeds to the step 45.

On the other hand, when the flag for indicating that a receiving buffer is full F2 is not set (F2=0), that is, when the amount of the data received after the receiving is started does not reach the capacity of the received data storage area, it is judged whether or not the receiving of the data corresponding to all the pages sent is terminated on the basis of the state of the flag for judging the termination of sending F4 (step 34).

If the flag for judging the termination of sending F4 is not set (F4=0), it is judged that the sending of the data corresponding to all the pages sent is not terminated, so that the program is returned to the step 33. On the other hand, if the flag for judging the termination of sending F4 is set (F4=1), it is judged that the sending of the data corresponding to all the pages sent is terminated, so that the program proceeds to the step 45.

When the number of command systems remaining as objects to be selected is one in the above described step 42, the program also proceeds to the step 45.

More specifically, when the number of command systems remaining as objects to be selected is one (YES in the step 42), when the above described processing of selecting command systems in the steps 38 to 44 is terminated for all the key data in the received data corresponding to the capacity of the received data storage area so that the number of command systems remaining as objects to be selected is two or more (YES in the step 34), or when the amount of the received data corresponding to all the pages sent is not more than the capacity of the received data storage area and the processing of selecting command systems for all the key data in the received data is terminated so that the number of command systems remaining as objects to be selected is two or more (YES in the step 35), the processing in the step 45 is performed.

In the step 45, a command system assigned the highest priority, the command system for the A company in this example is selected. It is judged whether or not the command system for the A company is an object to be selected on the basis of the state of the flag for indicating that a command system is excluded from objects to be selected for the A company Fa (step 46). If the command system for the A company is an object to be selected (Fa=0), the printing program for the A company is selected (step 48), so that the processing of automatically selecting printing programs is terminated. Therefore, printing process is executed on the basis of the printing program for the A company.

On the other hand, if the command system for the A company is not an object to be selected (Fa=1), a command system assigned the priority lower by one than that assigned to the command system for the A company, the command system for the B company in this example is selected (step 47), and it is judged whether or not the command system for the B company is an object to be selected on the basis of the state of the flag for indicating that a command system is excluded from objects to be selected for the B company Fb (step 46). If the command system for the B company is an object to be selected (Fb=0), the printing program for the B company is selected (step 48), so that the processing of automatically selecting printing programs is terminated. Therefore, printing processing is executed on the basis of the printing program for the B company.

On the other hand, if the command system for the B company is not an object to be selected (Fb=1), a command system assigned the priority lower by one than that assigned to the command system for the B company, the command system for the C company in this example is selected (step 47), and it is judged whether or not the command system for the C company is an object to be selected on the basis of the state of the flag for indicating that a command system is excluded from objects to be selected for the C company Fc (step 46). When the command systems for the A company and the B company are not objects to be selected, the command system for the C company is inevitably an object to be selected in this step 46 (Fc=0). Accordingly, the printing program for the C company is finally selected (step 48), so that the processing of automatically selecting printing programs is terminated. Therefore, printing processing is executed on the basis of the printing program for the C company.

In order to clarify the relationship among the processing shown in FIG. 4, the processing shown in FIG. 5 and the processing shown in FIG. 6, description is made of the flow of the whole processing. In a time period elapsed from the time when the processing of automatically selecting printing programs shown in FIGS. 6a and 6b is started until data is sent, the processing in the steps 33, 34 and 35 is repeated. When data corresponding to one word is sent to, for example, the P1 port, the interruption processing shown in FIG. 4 (steps 1 to 8) is started, so that received data is stored, the number of times of receiving is counted by the first counter, and the second counter is reset. In addition, the value k2 of the second counter for measuring reference time is updated in the steps 11 to 14 in the processing of measuring reference time shown in FIG. 5. However, data corresponding to one word is sent before the reference time has elapsed and the second counter is reset in the step 8 in the interruption processing every time the data is sent until the receiving of data corresponding to all pages sent is terminated, so that the counted value k2 does not reach the reference value Ko2.

When the receiving of data is started, the inquiry is answered in the negative in the step 33 in the processing of automatically selecting printing programs, so that key data is retrieved (steps 33 to 37). When the key data is retrieved, the processing of selecting command systems in the steps 38 to 44 is performed on the basis of the key data retrieved. When the number of command systems remaining as objects to be selected is one, the processing of determining printing programs in the steps 45 to 48 is performed, so that a predetermined printing program is selected. Consequently, the processing of automatically selecting printing programs is terminated. Therefore, printing processing is performed on the basis of the selected printing program.

When the receiving of the data corresponding to all the pages sent after the processing of automatically selecting printing programs is terminated, the interruption processing is not performed until the succeeding data is sent, so that the second counter is not reset. Consequently, when the reference time has elapsed after the final data out of the data corresponding to all the pages sent is received, the inquiry is answered in the affirmative in the step 14 in the processing of measuring reference time, so that the program proceeds to the step 15. In the step 15, the inquiry is answered in the negative because the processing of automatically selecting printing programs has been already terminated, so that the program proceeds to the steps 16, 17 and 18. As a result, the processing of automatically selecting printing programs is started again, all the ports are brought into an interrupt enable state, and the flag for judging exclusive control F1 is reset.

When the number of command systems remaining as objects to be selected is two or more as a result of performing the processing of selecting command systems in the steps 38 to 44 on the basis of the key data retrieved, the succeeding key data is retrieved in the steps 33, 36 and 37, so that the processing of selecting command systems in the steps 38 to 44 is performed again. In addition, when the final storage location and the final retrieval location are the same in the step 33, the amount of the received data does not reach the capacity of the receiving buffer, and the receiving of the data corresponding to all the pages sent is not terminated, the processing in the steps 33, 34 and 35 is repeated.

If the amount of the received data reaches the capacity of the receiving buffer while the processing of automatically selecting printing programs is being executed, the flag for judging that a receiving buffer is full F2 is set in the step 7 in the interruption processing. Consequently, in a case where the amount of the received data corresponding to all the pages sent is not less than the capacity of the receiving buffer, if the processing of selecting command systems is performed for all key data in the data corresponding to the capacity of the receiving buffer so that the number of command systems remaining as objects to be selected is two or more, the inquiry is answered in the affirmative in the step 34. Accordingly, a predetermined printing program is selected by the processing of determining printing programs in the steps 45 to 48. Consequently, the processing of automatically selecting printing programs is terminated. Therefore, printing processing is performed on the basis of the selected printing program.

On the other hand, in a case where the amount of the received data corresponding to all the pages sent is less than the capacity of the receiving buffer, if the receiving of the data corresponding to all the pages sent is terminated and the processing of selecting command systems is performed for all the key data in the received data corresponding to all the pages sent so that the number of command systems remaining as objects to be selected is two or more, the processing in the steps 33, 34 and 35 is repeated. When the reference time has elapsed after the receiving of the data corresponding to all the pages sent is terminated so that the program proceeds to the step 15 from the step 14 in the processing of measuring reference time, the processing in the steps 33 to 35 in the processing of automatically selecting printing programs is being executed, so that the inquiry is answered in the affirmative in the step 15. Consequently, the program proceeds to the steps 19 and 20, so that the flag for judging the termination of sending F4 is set. As a result, the inquiry is answered in the affirmative in the step 35 in the processing of automatically selecting printing programs, so that a predetermined printing program is selected by the processing of determining printing programs in the steps 45 to 48. Consequently, the processing of automatically selecting printing programs is terminated. Therefore, printing processing is performed on the basis of the selected printing program.

When the counted value k2 of the second counter reaches the reference value Ko2 after the processing of automatically selecting printing programs is terminated, the inquiry is answered in the affirmative in the step 14 and answered in the negative in the step 15, so that the program proceeds to the steps 16, 17 and 18. Consequently, the processing of automatically selecting printing programs is started again, all the ports are brought into an interrupt enable state, and the flag for judging exclusive control F1 is reset.

In a case where the printing processing is executed when the amount of the received data corresponding to all the pages sent is not less than the capacity of the receiving buffer, every time data is read from the receiving buffer so as to produce data for printing, the succeeding received data is read in the receiving buffer.

In the above described embodiment, it is judged whether or not key data included in data sent from the host computer 31, 32 or 33 exists in the command systems for companies selected in ascending order of priorities, and a command system in which it is judged that no key data exists is excluded from the objects to be selected (in the above described steps 38 to 44). When the number of command systems remaining as objects to be selected is one (YES in the above described step 42), it is judged that the one command system is a command system to which the data sent from the host computer 31, 32 or 33 belongs (in the above described steps 45 to 48).

On the other hand, when the number of command systems remaining as objects to be selected is two or more (NO in the above described step 42) as a result of judging whether or not the key data exists in each of all the command systems, it is judged again whether or not the other key data included in the data sent from the host computer 31, 32 or 33 exists in each of the command systems remaining as the objects to be selected. In such a manner, when the number of command systems remaining as objects to be selected is one, it is judged that the one command system is a command system to which the data sent from the host computer belongs (in the above described steps 45 to 48).

When the number of command systems remaining as objects to be selected is two or more as a result of performing the processing of selecting command systems for each of all key data in the received data corresponding to the capacity of the receiving buffer after the receiving is started when the amount of the received data corresponding to all the pages sent is more than the capacity of the receiving buffer, and for each of all key data in the received data corresponding to all the pages sent when the amount of the received data corresponding to all the pages sent is less than the capacity of the receiving buffer (YES in the above described step 34 or 35), it is judged that the command system assigned the higher priority is a command system to which the data sent from the host computer 31, 32 or 33 belongs (in the above described steps 45 to 48).

Judgment whether or not the receiving of the data corresponding to all the pages sent is terminated when the amount of the received data is less than the capacity of the receiving buffer is made by judging whether or not within the reference time elapsed from the time when the receiving of data is interrupted, succeeding data is received. It is judged that the receiving of the data corresponding to all the pages sent is terminated when within reference time elapsed from the time when the receiving of data is interrupted, succeeding data is not received (in the above described step 35).

When the command system corresponding to the printing program selected in the above described step 48 is not a command system assigned the highest priority, the priority of the command system corresponding to the printing program selected and the priority of a command system currently assigned the highest priority may be automatically replaced with each other.

Furthermore, it may be indicated on the display which command system corresponds to the printing program selected in the step 48.

Additionally, priorities assigned to the command systems may be set for each host interface 21, 22 or 23. In this case, priorities corresponding to the host interface 21, 22 or 23 from which data is sent are used in the processing of automatically selecting printing programs.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A printer for performing printing processing on the basis of data sent from a host apparatus having a command system, the host apparatus data having control characters including an escape character, and one or more characters subsequent to the escape character, the printer comprising:

first storing means for storing a plurality of printing programs corresponding to a plurality of command systems, the command systems each assigning different meanings to at least some characters subsequent to the escape character;

second storing means for storing, for each command system, the presence or absence of at least those control characters employed by each command system which are not common to all of the command systems;

third storing means for storing priorities assigned to each of the plurality of command systems;

first judging means for judging which of the plurality of command systems is a command system employing control characters included in data sent from the host apparatus on the basis of data stored in the second storing means, to thereby determine which of the plurality of command systems is a command system associated with the data sent from the host apparatus, the first judging means judging a) for each of the plurality of command systems, in ascending priority order of each of the plurality of command systems, whether or not one or more of the control characters included in the data sent from the host apparatus is employed by each command system, and excluding command systems that do not employ the one or more of the control characters from being associated with the data sent from the host apparatus, b) when a number of command systems which are not excluded from being associated with data sent from the host apparatus is one, that the one not excluded command system is to be associated with data sent from the host apparatus, and c) when (i) every control character in the data sent from the host apparatus has been judged to determine whether each control character included in the data sent from the host apparatus is employed by each command system, and (ii) a number of command systems which are not excluded from being associated with data sent from the host apparatus is at least two, that the command system assigned a higher priority out of the at least two command systems is a command system to which the data sent from the host apparatus is associated.

2. A printer according to claim 1, wherein a plurality of host interfaces for connecting a plurality of host apparatuses are connected to the printer, the printer further including:

data selecting means for accepting data sent from an arbitrary host interface out of the plurality of host interfaces and for inhibiting acceptance of data sent from other host interfaces;

second judging means for judging that the acceptance of data sent from the arbitrary host interface is terminated; and means for permitting acceptance of data sent from the other host interfaces when the second judging means has judged that the acceptance of data corresponding to all the pages sent from the arbitrary interface has terminated.

3. A printer according to claim 2, wherein the second judging means judges, when an interval at which data are received reaches not less than a predetermined reference time, that the acceptance of data corresponding to all the pages sent from the arbitrary interface is terminated.

4. The printer according to claim 1, including indicating means for indicating which of the plurality of command systems corresponds to the selected printing program.

5. The printer according to claim 1, further including input means for setting the priorities.

6. The printer according to claim 1, further including means for automatically altering, when a selected printing program is not a printing program assigned a highest priority, a priority assigned to the selected printing program and a priority assigned to a printing program previously assigned a highest priority.

7. The printer according to claim 1, wherein a plurality of host interfaces for simultaneously connecting a plurality of host apparatuses are connected to the printer, and wherein the printer includes input means for setting priorities for each host interface.

8. The printer according to claim 1, including a receiving buffer wherein the judging means judges which of the plurality of command systems is a command system employing control characters included in a required amount of data sent from the host apparatus, the required amount of received data being received data stored in the receiving buffer after receiving is started corresponding to the capacity of the receiving buffer when the amount of data corresponding to all pages sent is not less than the capacity of the receiving buffer, and being received data stored in the receiving buffer after the receiving is started corresponding to all the pages sent when the amount of the data corresponding to all the pages sent is less than the capacity of the receiving buffer.

9. The printer according to claim 8, wherein judgment, as to whether or not receiving of data corresponding to all pages sent has terminated is made depending on whether or not an interval at which data are received is not less than a predetermined reference time.

10. The printer according to claim 9, including a reference time setting means for setting the reference time.

* * * * *